United States Patent [19]
Leenhouts

[11] 3,746,958
[45] July 17, 1973

[54] MOTOR CONTROL FOR A STEPPING MOTOR

[75] Inventor: Albert C. Leenhouts, Harwinton, Conn.

[73] Assignee: The Superior Electric Company, Bristol, Conn.

[22] Filed: Nov. 10, 1971

[21] Appl. No.: 197,239

[52] U.S. Cl. .................................. 318/696, 318/138
[51] Int. Cl. ............................................ H02k 37/00
[58] Field of Search ............... 318/576, 696, 685, 318/439, 138, 254

[56] References Cited
UNITED STATES PATENTS
3,614,580  10/1971  Eto .................................... 318/696
3,648,144  3/1972  Rosen ............................... 318/696
3,609,500  9/1971  Causer .............................. 318/696
3,621,358  12/1971  Hinrichs ........................... 318/696

Primary Examiner—G. Simmons
Attorney—Arthur A. Johnson and Ernest M. Junkins et al.

[57] ABSTRACT

A motor control for a stepping motor having windings whose energizations are changed according to a sequence with each change producing a movement and with each change being commanded by an input pulse. The motor control enables each movement to be selected as either a full step or a half step in either a forward or reverse direction for each pulse by the use of a counter having a different count for each possible winding energization combination and by having its count changed a constant number that is different for each selectable movement.

9 Claims, 2 Drawing Figures

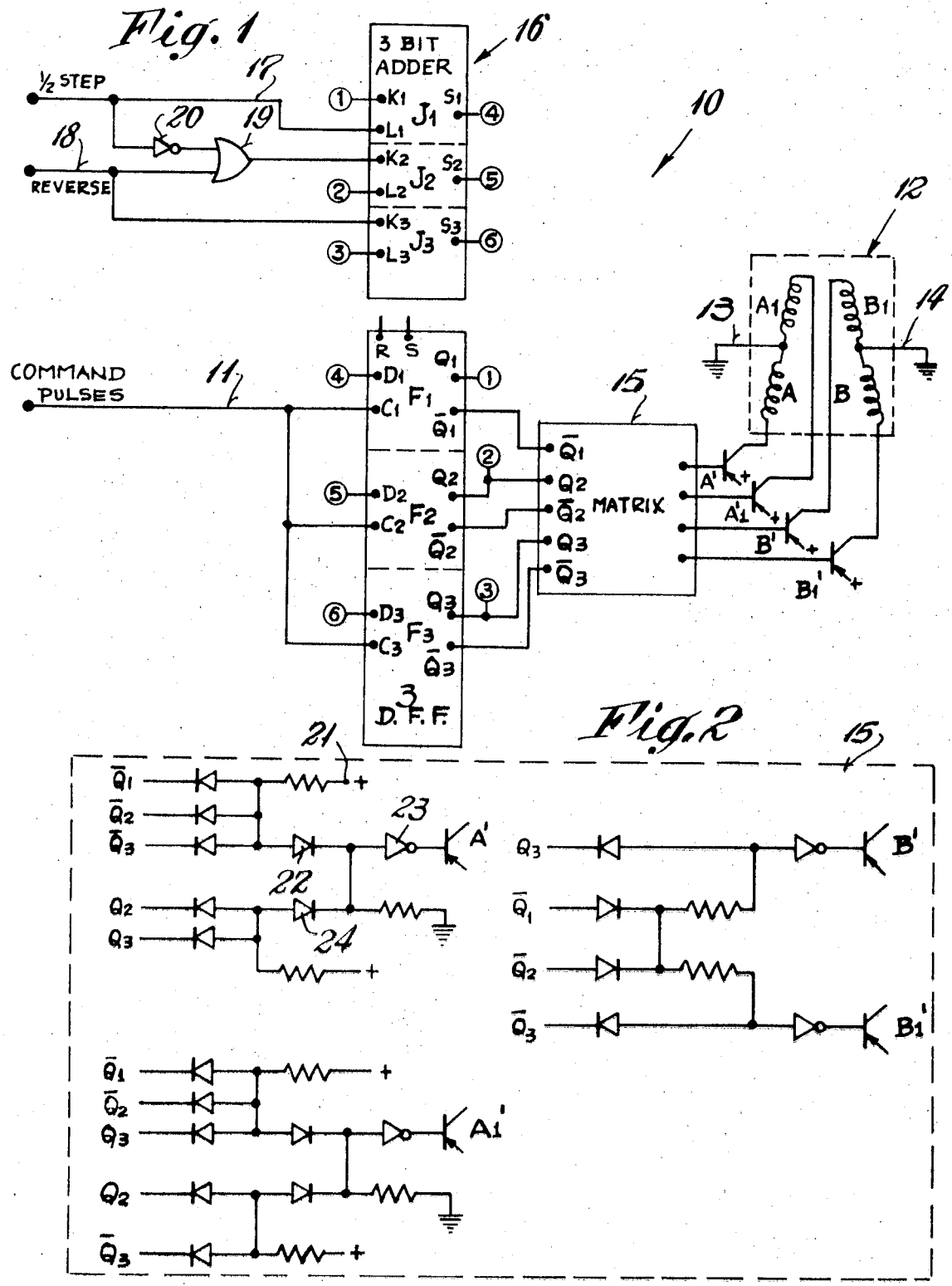

MOTOR CONTROL FOR A STEPPING MOTOR

In U.S. Pat. No. 3,280,395 granted Oct. 18, 1966 and assigned to the assignee of the present invention there is disclosed a control circuit for a stepping motor that translates each input pulse into a change of energization of the windings of the motor to produce an incremental movement or step. The windings are connected into two phases with each phase having two sets and the sequence of changes alternates the winding set that is energized alternately between the phases in a four step sequence. In U.S. Pat. No. 3,077,555 also assigned to the assignee of the present invention there is disclosed the energizing of a stepping motor with either a four step sequence or an eight step sequence so that each command produces in the eight step sequence one half the step of a four step sequence or a half step movement. The latter circuit, however, requires manual operation and is not capable of producing steps in accordance with electrical information such as command pulses, direction and extent of movement commands.

It is accordingly an object of the present invention to provide a motor control for a stepping motor which is capable of providing either full or half steps in response to electrical command pulses.

Another object of the present invention is to provide a motor control for changing the energization of a stepping motor according to a desired sequence which is susceptible to using integrated circuits to effect economy in manufacture and reliability in use.

A further object of the present invention is to achieve the above objects with a motor control that is capable of receiving electrical directions to have the motor move in either full step or half step increments for each command pulse and also be responsive to electrical directions for setting the direction of movement of the steps.

In carrying out the present invention, the stepping motor is of the type disclosed in the above-noted U.S. Pat. No. 3,280,395 and has two phases A and B with each phase having a winding set denoted A and A1, and B and B1. Each set is connected through a semiconductor to a source of direct current such that the semiconductor when rendered conducting effects energization of the winding set associated therewith and thus each winding set may be individually controlled. In a four step sequence, the windings are energized according to the sequence AB1, A1B1, A1B, AB, AB1, etc., for movement in one direction while the reverse of the sequence effects incremental movement in the other direction. In addition, for an eight step sequence or half stepping, the windings are energized according to the sequence AB1, B1, A1B1, A1, A1B, B, AB, A, AB1, etc., with again the reversal of the sequence effecting movement in the reverse direction. Accordingly, for each command pulse received by the motor control, the winding sets have their energization changed to the next step in the sequence depending upon whether it is full step or half step and also depending upon the direction in which it is desired for the motor to move.

The motor control includes a counter having a maximum count which equals the maximum number of possible combinations of winding set energizations which in the present instance is eight and hence only three binary counting bits are required. Each count of the counter is made to provide through a decoding matrix, a different combination of winding set energizations. More particularly, the counter as it increases its count upwardly by one count for each command pulse causes through the matrix, the sequence of energization of the winding sets according to the half step forward direction. With a decreasing count of one of each command pulse, the winding sets are energizing in the reverse direction sequence.

The counter includes three delay type flip-flops which have their outputs connected to the matrix. Their separate outputs may be combined into any one of eight different counts depending on their states and for each different energization of the winding sets, the flip-flops have a different count. The states of the flip-flops is set by a three bit full adder with parallel outputs with the adder having states or a count which the flip-flops are to assume for the next change of energization. The adder count is determined by adding a constant number to the count of the flip-flops with the constant number being dependent on whether or not the next step is to be a full or a half step and whether or not it is to be in the forward or reverse direction. Thus, at any instant, the flip-flops have the count required for the present required energization of the winding sets while the adder has the count required for the next required energization.

When the next command pulse is received, the count of the adder is assumed by the flip-flops to effect the change of energization of the winding set as directed by the adder count and the adder will assume the count required for the next change by the addition thereto of a constant number whose value depends on whether the commands are for half or full steps in either a forward or reverse direction.

Other features and advantages will hereinafter appear.

Referring to the drawing:

FIG. 1 is a diagrammatic and schematic illustration of the motor control of the present invention.

FIG. 2 is a schematic diagram of the matrix.

Referring to the drawing the motor control is generally indicated by the reference numeral 10 and includes an input lead 11 on which command pulses are provided, the pulses being a change from a low voltage to a high positive voltage to a low voltage with the low voltage being effectively zero and being hereafter indicated by the logic symbol 0 while the high voltage is perhaps +5 volts and indicated by the logic symbol 1. Each pulse into the system 10 effects a change of energization of the windings in a motor diagrammatically shown within the block 12 with the windings being connected to form a first phase having winding sets A and A1 and a second phase having winding sets B and B1.

The winding sets are individually energizable by each having a connection through a transistor indicated as A', A1', B' and B1' with the emitter of the transistors being connected to a positive D.C. source indicated by a +sign. The junction of the first phase winding sets is connected to a ground as by a lead 13 while the junction of the winding sets of the second phase is also connected to ground by a lead 14.

The base of each of the transistors is connected to a terminal in a matrix, generally indicated by the numeral 15 which in turn has a plurality of inputs that are connected to the output of three delay type bistable flip-flops denoted F1, F2 and F3. The flip-flop F1 has inputs D1 and C1 together with outputs Q1 and $\bar{Q}1$. In addition, each of said flip-flops are provided with terminals S and R (only those for F1 being shown) with a positive voltage on a terminal S setting the state of the flip-flop to a 1 state where $Q1 = 1$ while a positive voltage on the termina R sets the state of the flip-flop F1 such that $\bar{Q}1$ is a logical 1.

The other two flip-flops F2 and F3 have similar terminals as is conventional in the art with the former denoted by the inclusion of the reference numer 2 with the terminal letter indicating its terminals while the latter is denoted by the inclusion of the reference number 3 with its terminal letter.

As shown on the drawing, the outputs $\bar{Q}1$, Q2, $\bar{Q}2$, Q3 and $\bar{Q}3$ are connected to the matrix 15 to supply information thereto as to the states of the flip-flops F1, F2 and F3.

In particular, the flip-flops are of the delay type in which each will assume the state dictated by the logic voltage on its terminal D such that if D is a logical 0 then terminal $\bar{Q}$ is made to be a 1 while if D is 1 then terminal Q is 1. In addition, the state of the flip-flop set by the logic voltage at the terminal D occurs when terminal C is subjected to a change from a low or zero voltage to a high positive voltage which in effect is a change from a logical 0 to 1. Thus the terminal D may have a logic voltage applied thereto which does not effect the state of the flip-flop until the positive going change or edge of a pulse is applied at the terminal C. Such flip-flops are available in packages of two from RCA Corporation, Solid State Division, Somerville, N.J. and denoted type CD4013A.

The motor control also includes a three bit full adder 16 having parallel carry out with a first bit denoted J1, a second bit J2 and a third bit J3. Such devices are also available from RCA Corporation and denoted by type No. CD4008A for a four bit adder. It will be understood that in such a device the bit JI will assume a state causing S1 to be a logical 0 if both K1 and L1 are logical 0 and will cause S1 to be a logic 1 if either K1 or L1 is a 1. In addition, if K1 and L1 are both 1, S1 will also be a 0 but it will provide a carry over signal to the bit J2 thus the state of J2 is dependent upon a carry over signal from J1 plus the sum of the states at the terminals K2 and L2. Similarly J3 responds to carry over signal from bit J2 in addition to the logic values on its terminals K3 and L3. The change from logical 1 to 0 of bit J3 effects the spillover of the adder but the spillover is neglected. Thus the three bit adder 16 may have eight possible combinations of the logical values of S1, S2 and S3 and the value of each terminal is dependent upon the information supplied to their respective terminals. It is also noted that each bit of the adder will change whenever there is a change of the input information to it as by one of its terminals changing in logic values.

The terminals S1, S2 and S3 are connected to circled numerals 4, 5 and 6 respectively to show connection to identically circled numerals that constitute the input to the terminals D1, D2 and D3 of the three flip-flops F1, F2 and F3, respectively. Similarly circled numerals 1, 2 and 3 connected to Q1 Q2 and Q3, respectively are connected to terminals K1, L2 and L3, respectively of the adder 16 through identically circled numerals.

In addition to the command pulses appearing on the input lead 11, other information to the control includes a lead 17 which is connected to the terminal L1 and is denoted half step. If it is desired to have the motor move in the eight or half step sequence then a logical 1 of high positive voltage is applied on this lead. Another input lead to the control 10, is indicated by the reference numeral 18 and it is denoted reverse and enables a high positive voltage or logic 1 applied therelo to enable the motor to move in the reverse direction while with a logical 0 on the lead 18 the motor may move in a forward direction.

A gate 19 receives input information from the lead 17 through an inverter 20 and also from the lead 18 and functions to supply to the terminal K2 a logical 1 for all conditions except for a logical 1 on the half step lead 17 and a logical 0 on the reverse lead 18. Accordingly, terminal K2 is a logical 0 only for direction to move the motor forwardly in the eight step sequence.

In the operation of the circuit the maximum count of the counter which includes the flip-flops F1,F2 and F3 and the adder 16, at least equals the maximum number of possible winding set combinations of energization which in the present embodiment equals eight. For each count of the counter the winding sets are made to have a selected energization by the matrix 15. Further each increasing unit count of the counter corresponds to the next sequence of changes of energization of the winding sets according to the eight step sequence. Thus, the count of zero of the counter(all three FF having $Q = 0$) effects energization of winding sets A and B1, a numerical count of one of the counter will only effect energization of just the winding set B1 while a numerical count of two effects energization of the winding sets A1 and B1, count three energization of the winding set A1 only. Further, numerical counts of four, five, six and seven will produce the energization of the remainder of the forward sequence, namely, A1B, B, AB, A, respectively. Thus by increasing the counter by a constant unit or one for each input pulse, the windings may be energized in the forward half step sequence. On the other hand if there is added to the counter a constant number seven then the counter will, in effect reverse its count by one for each input count of seven. In this manner, the count of the counter is made to decrease by one which in turn will provide a reverse movement of the motor in the half step sequence as the winding set sequences of energization are reversed.

The increase of the count by one in the forward direction is achieved in the bit J1 at the terminal L1 by this terminal being maintained a logical 1 while the addition of a count of seven to the adder 16 is achieved by having lead 17 and lead 18 both a logical 1 which also makes K2 a logical 1 such that terminals L1, K2 and K3 are each 1.

If it is desired to full step the motor, i.e., have its changes of energization follow the four step sequence, then the counter is made to have a numerical count of zero, two, four, six, zero, etc., for movement in a forward direction or a count of zero, six, four, two, zero, etc., for movement in the reverse direction. This is achieved by applying from the gate 19 to the terminal K2 a logical 1 which is in effect a count of a constant number two for movement in the forward direction while for movement in the reverse direction a count of six is added to a adder 16 by having the terminals K3 and K2 both a logical 1. For a full step movement in which only one winding is energized for each step, odd counts of one, three, five and seven are employed which is obtained by maintaining the state of F1 to have $Q1 = 1$ (through for example terminal S thereof) instead of being maintained at Q1 = 0 as in the prior mentioned full step sequence.

The terminals S1, S2 and S3 of the adder 16 are connected to the terminals D1, D2 and D3 of the flip-flops F1, F2 and F3 respectively and each terminal D will have or follow their respective terminal S. Thus for the condition where S1, S2 and S3 are each logical 0 and terminals D being the same, then upon the receipt of a command pulse on the lead 11, at the trailing edge thereof the terminals Q1, Q2 and Q3 will each become logical 0 which is applied not only to the matrix but also to the terminals K1, L2 and L3 respectively. However, the making of these terminals a logical 0 causes the adder to function to sense its other inputs which consist only of the logical 1 on the terminal L1. Thus J1 will add K1 (a logical 0) and L1 (a logical 1) to change its count so that S1 will change to a logical 1 while terminals S2 and S3 remain logical 0. This in turn causes D1 to be a logical 1 while terminals D2 and D3 remain a logical 0.

Upon the next input pulse occurring, the trailing edge thereof will cause Q1 to become a 1 (as D1 is a 1) so that J1 then changes its state to make S1 a logical 0 by adding the logical 1 on K1 and the logical 1 on L1. In addition J2 changes its state to make S2 a logical 1 in view of the carry-over from J1 while K2 and L2 are each a logical 0. Thus for the next command pulse D1 and D3 are logical 0 while D2 is a 1 which in turn will subsequently make on the positive going edge of the command pulse, terminals Q1 and Q3 to be a logical 0 and Q2 a logical 1.

With these Q logic states applied to the adder 16 together with the logical 1 at L1, terminal S1 then becomes a logical 1, S2 remains a logical 1 and S3 remains a 0 representing a numerical count of three. The states of the bits J1, J2 and J3 are then applied to the flip-flops F1, F2 and F3, respectively to cause on the positive going edge of the next command pulse, Q1 and Q2 to become logical 1 and Q3 to remain 0.

It will thus be seen that the flip-flops F1, F2 and F3 maintain the count of the counter until they are changed by the positive going edge of a next pulse. The new states to which the flip-flops are changed are then applied as a binary count to the adder 16 which in the half step forward direction adds to it a count of one from the half step lead 17 each time there is a change which occurs each time there is a command pulse and sets the terminals D1, D2 and D3 for the new binary states of the flip-flops.

For operation with the next command pulse with the adder having a count of seven wherein terminals S1, S2 and S3 are each a logical 1 and terminals Q1, Q2 and Q3 are logical 0, 1, 1, respectively, the flip-flops F1, F2 and F3 each change to make Q a 1 and J1 shifts to make S1 a 0 by adding the logical 1 from the lead 17 with S2 and S3 also becoming logical 0 and the spillover shifting of bit J3 is neglected.

For half step movement in the reverse direction by lead 18 being a logical 1 and assuming that terminals S1, S2 and S3 are each logical 0, the bit J1 has a logical 0, terminal K1 input and a logical 1, terminal L1 input; the bit J2 has a 1, K2 input and a 0, L2 input while the bit J3 has a 1, K3 input and a 0, L3 input. With the command pulse causing the flip-flops F1, F2 and F3 to change, bit J1 will change S1 to a logical 1 by the terminal L1; bit J2 will change S2 to a logical 1 by the addition of the 1 in K2 and J3 will cause S3 to become a 1 such that the numerical count of the adder 16 becomes seven (binary 111). These binary states are applied to the terminals D1, D2 and D3 such that the next command pulse causes Q1, Q2 and Q3 each to be a 1 which when applied to the adder 16 makes S1 a 0 by the addition of the 1's in K1 and L1, makes S2 a 1 by the addition of the 1 on K2, the 1 on L2 and the 1 carry over from J1 while S3 also remains a 1 by adding the 1's from K3, L3, and the carry over from J2. There is thus the binary number 110 which represents the numerical count of six and is applied to the terminals D of the flip-flops for changing their states thereof for the next input pulse.

When it is desired to effect full stepping of the motor, the lead 17 has a logical 0 voltage. Assuming that lead 18 is also a logical 0 for forward movement, the terminal K2 is a logical 1 such that in effect J1 and F1 maintain continuously the same state wherein S1 is 0 and Q1 is a 0 while K2 has added to it a logical 1 (which is numerically equal to a count of two) on the terminal K2 each time there is a command pulse. For full stepping in the reverse direction, a numerical count of six is added to the counter for each command pulse by having both terminals K2 and K3, a logical 1. Assuming S2 and S3 are both logical 0, the next command pulse will make Q2 and Q3 each a logical 0 which will cause in the bit J2 the addition of the 1 to its 0 state to change S2 to a logical 1 while in bit J3, the K3 logical is added to the logical 0 on terminal L3 which makes terminal S3 a logical 1. The adder then represents a numerical count of six to effect energization of the winding sets A1 and B1 for the next step when the current step is a numerical count of zero. Flip-flop F1 is maintained at Q1 = 0 for the sequence having both windings energized or Q1 = 1 for the sequence when only one winding is energized.

Shown in the following chart are the various logical states for both half step and full step directions and also for reverse half step and full step. Thus, for the sequence of half steps forward of increments one through eight, the half step lead 17 is continually a logical 1 while the reverse lead 18 is a logical 0. For the eight step sequence in the reverse direction again the half step lead 17 remains a logical 1 while the reverse lead becomes a logical 0. On the other hand for full stepping on the four step sequence the half step lead 17 is a logical 0 while the reverse lead 18 is either a logical 0 or 1 for forward or reverse movement, respectively.

The sequence of energizations are AB1, B1, A1B1, A1, A1B, B, AB, A for the forward direction in half setepping for the counts zero through seven as shown in the chart wherein a 1 indicates that the winding set is energized and a 0 indicates that a set is deenergized. Moreover, there is shown in the chart the states for the different terminals S1, S2 and S3 (D1, D2 and D3 being identical) and the terminals Q and Q̄ of the flip-flops F1, F2 and F3.

| Increment | 1 2 3 4 5 6 7 8 | 1 2 3 4 5 6 7 8 | 1 2 3 4 | 1 2 3 4 |
|---|---|---|---|---|
| 1/2 Step (17) | 1 1 1 1 1 1 1 1 | 1 1 1 1 1 1 1 1 | 0 0 0 0 | 0 0 0 0 |
| Reverse | 0 0 0 0 0 0 0 0 | 1 1 1 1 1 1 1 1 | 0 0 0 0 | 1 1 1 1 |
| A1 | 0 0 1 1 1 0 0 0 | 0 0 0 0 1 1 1 0 | 0 1 1 0 | 0 0 1 1 |
| A | 1 0 0 0 0 0 1 1 | 1 1 1 0 0 0 0 0 | 1 0 0 1 | 1 1 0 0 |
| B1 | 1 1 1 0 0 0 0 0 | 1 0 0 0 0 0 1 1 | 1 1 0 0 | 1 0 0 1 |
| B | 0 0 0 0 1 1 1 0 | 0 0 1 1 1 0 0 0 | 0 0 1 1 | 0 1 1 0 |
| Count (FF) | 0 1 2 3 4 5 6 7 | 0 7 6 5 4 3 2 1 | 0 2 4 6 | 0 6 4 2 |
| Q1 | 0 1 0 1 0 1 0 1 | 0 1 0 1 0 1 0 1 | 0 0 0 0 | 0 0 0 0 |
| Q̄1 | 1 0 1 0 1 0 1 0 | 1 0 1 0 1 0 1 0 | 1 1 1 1 | 1 1 1 1 |

```
Q2       00110011 01100110 0101 0101
Q̄2       11001100 10011001 1010 1010
Q3       00001111 01111000 0011 0110
Q̄3       11110000 10000111 1100 1001
Count (adder)  12345670 76543210 2460 6420
S1       10101010 10101010 0000 0000
S2       01100110 11001100 1010 1010
S3       00011110 11110000 0110 1100
```

It will be understood from the chart that the actual energization of the windings is that dictated by the count or states which the flip-flops have and that the adder 16 has a count which corresponds to the next energization of the winding sets. Moreover, it will be seen that the binary count of the terminals Q1, Q2 and Q3 wherein Q1 is a first digit, Q2 a second digit and Q3 a third digit is the binary number equivalent to its numerical decimal count. Further, it will be understood that for each step in the eight step sequence terminals Q1 and Q̄1 will alternate while in each step of the four step sequence terminals Q2 and Q̄2 will alternate while Q1 and Q̄1 remain constant.

Referring to the matrix shown in FIG. 2, information of the state of all of the Q terminals is required except for the terminal Q1 so that there are five connections constituting inputs to the matrix from the outputs of the flip-flops F1, F2 and F3. The outputs of the matrix are connected to the bases of the transistors A', A1', B', and B1' and when a logical 0 is applied to the base of a transistor the transistor will be caused to be conducting to effect energization of its associated winding set.

The matrix consists of a plurality of diodes and resistances as shown together with connections to a source of positive power (+ symbol). Referring to the portion of the matrix 15 connected to the base of transistor A', this transistor is rendered conducting anytime Q̄1, Q̄2 and Q̄3 are a logical 1 by reason of the +terminal 21 through the diode 22 applying a logical 1 to the base of inverting gate 23. In addition, if both terminals Q2 and Q3 are a logical 1 then again transistor A' will conduct as the + source applies a positive voltage through diode 24 to the base of inverter 23. Thus, transistor A' can only conduct when Q̄1, Q̄2 and Q̄3 are all at a logical 1 or alternatively when Q2 and Q3 are both a logical 1 which represents counts of zero, six and seven. Transistor A1' will conduct only when Q̄1, Q̄2 and Q̄3 are all logical 1 or when Q̄2 and Q̄3 are both a logical 1 which represents counts of two, three and four.

With respect to the transistors B' and B1', transistor B1 will conduct when either Q̄1 or Q̄2 is a logical 1 and simultaneously therewith Q̄3 is a logical 1 which occurs for counts four, five and six. Transistor B1' conducts for counts zero, one and two only when either Q̄1 or Q̄2 is a logical 1 (but not both) and simultaneously Q̄3 is a 1.

Accordingly, it will be understood that there has been disclosed a motor control for a stepping motor which is capable of providing a change of energization to the motor for each command pulse with each change producing an incremental movement of the motor. The incremental movement may be a full step in the specific embodiment of the motor shown constituting four steps per sequence or may be half steps in which there are eight steps per sequence. The circuit includes a counter which has a different count for each different combination of winding set energizations and according to input instructions will change its count for each input pulse to the count required for the next energization combination. The input instructions consist of electrical commands that dictate use of either the half step or the full step sequence for each command pulse and whether the motor is to move in either the forward or reverse direction.

Variations and modifications may be made within the scope of the claims and portions of the improvements may be used without others.

I claim:

1. A motor control for a stepping motor having a plurality of winding sets with the sets having a selected number of possible combinations of energization comprising an input on which command pulses are received, a counter having a different count for each possible combination, means for individually energizing each set, decoding means connected between the counter and the energizing means to energize the sets a different combination for each different count and means for directing command pulses to the control to have each pulse change the count of the counter by a number that is selected from at least two different available numbers to thereby change the combination of the sets that are energized.

2. The invention as defined in claim 1 in which the motor is energized to move in one direction for each input pulse according to the preselected sequence, in which the motor is energized to move in the other direction for each input pulse according to a reversal of the preselected sequence, in which the constant number change of the counter for movement in one direction is different from the constant number change for movement in the other direction.

3. The invention as defined in claim 2 in which the preselected sequence has a maximum number of combinations of set energizations, in which the maximum count of the counter equals the maximum number of combinations, in which the constant number change of the counter count in the other direction is the difference between the maximum counter count and the constant number change for movement in the one direction.

4. The invention as defined in claim 2 in which the sets are energizable according to a second preselected sequence of combinations and in which the count of the counter is changed another constant number for each successive combination of the second sequence.

5. The invention as defined in claim 4 in which the second sequence has twice the number of combinations as the first sequence and in which the constant number change in the counter count for each input pulse for the second sequence is one half the constant number change for each input pulse for the first sequence.

6. The invention as defined in claim 2 in which the counter is a spillover counter and in which a constant number is added to the counter for each successive combination to produce the constant change.

7. The invention as defined in claim 1 in which the counter includes a plurality of bistable means and a multi bit adder means, there being one bistable means associated with each bit and in which each bistable means is made to assume the state of its associated bit in the adder means for each input pulse.

8. The invention as defined in claim 7 in which the decoding means includes a diode resistance matrix connected to sense the output of the bistable means and in which the matrix decodes the states to effect combination of set energization dictated by the states.

9. A motor control for a stepping motor having a plurality of winding sets with the sets having a selected number of possible combinations of energizations and being energized according to a desired sequence comprising an input on which command pulses are received with counting means including a plurality of flip-flops with the possible combination of states of the flip-flops being at least equal to the possible combination of energizations, said counting means further including an adder with the adder having a plurality of different states at least equal to the number of combinations of energizations, means for causing the states of the flip-flops to be changed to the states of the adder with each command pulse, means for causing each different state of the flip-flops to produce a different combination of energization of the winding sets and means for causing the adder to assume the state required for the next energization in the sequence for each change to a different state of the flip-flops.

* * * * *